US00RE43609E

(19) United States
(12) Reissued Patent
Kim et al.

(10) Patent Number: US RE43,609 E
(45) Date of Reissued Patent: Aug. 28, 2012

(54) METHODS AND APPARATUSES FOR RECORDING INFORMATION ON AND REPRODUCING INFORMATION FROM A RECORDING MEDIUM AND THE RECORDING MEDIUM

(75) Inventors: Byung-Jin Kim, Kyunggi-do (KR); Kang-Soo Seo, Kyunggi-do (KR); Jea-Yong Yoo, Seoul (KR)

(73) Assignee: LG Electronics, Inc., Seoul (KR)

(21) Appl. No.: 12/654,826

(22) Filed: Jan. 5, 2010

Related U.S. Patent Documents

Reissue of:
(64) Patent No.: 6,473,379
Issued: Oct. 29, 2002
Appl. No.: 09/688,241
Filed: Oct. 16, 2000

U.S. Applications:
(62) Division of application No. 10/973,099, filed on Oct. 26, 2004, now Pat. No. Re. 41,090.

(30) Foreign Application Priority Data

Oct. 29, 1999 (KR) ..... 99-47610

(51) Int. Cl.
*G11B 7/00* (2006.01)

(52) U.S. Cl. ..... 369/59.1; 369/47.1; 369/59.23

(58) Field of Classification Search ..... None
See application file for complete search history.

(56) References Cited

U.S. PATENT DOCUMENTS

| | | | |
|---|---|---|---|
| 4,835,757 | A | 5/1989 | Abiko |
| 6,094,723 | A | 7/2000 | Otsuka |

FOREIGN PATENT DOCUMENTS

| | | |
|---|---|---|
| EP | 0911830 | 4/1999 |
| EP | 0738078 | 8/1999 |
| KR | 10-1997-7004213 | 8/1997 |
| WO | WO 96/32720 | 10/1996 |

OTHER PUBLICATIONS

Korean Office Action dated Jun. 27, 2002.
Korean Office Action dated Feb. 10, 2003.

*Primary Examiner* — Muhammad N Edun
(74) *Attorney, Agent, or Firm* — Harness, Dickey & Pierce, PLC

(57) ABSTRACT

[The present invention relates to method for recording program specific information (PSI) for a recorded data stream in an optical disk such as a high-density digital versatile disk (HD-DVD) and providing the recorded PSI to a presenting device such as a digital television. This method writes program or stream specific information in a management data recording area of a high-density disk, and when the recorded data stream is reproduced, determines whether it is time to send the stream specific information, obtains stream specific information corresponding to a stream object being reproduced, or to be reproduced based on the determination result, and transmits the obtained stream specific information. This method can maintain the disk storage capacity for real video and/or audio data by recording stream specific information in a management recording area of a high-density disk, and provide the stream specific information to a digital television promptly when it is necessary, thereby reducing the time duration of blank screen or discontinuity in video and/or audio presentation.] *The methods and apparatuses record information on or reproduce information from a recording medium. The information includes at least video information and presentation control information for managing presentation of the video information. The presentation control information includes change information for the video information, and the change information indicates a point in the video information where at least a portion of the presentation control information for the video information changes.*

25 Claims, 6 Drawing Sheets

Conventional Art

Conventional Art

METHODS AND APPARATUSES FOR RECORDING INFORMATION ON AND REPRODUCING INFORMATION FROM A RECORDING MEDIUM AND THE RECORDING MEDIUM

Matter enclosed in heavy brackets [ ] appears in the original patent but forms no part of this reissue specification; matter printed in italics indicates the additions made by reissue.

*DIVISIONAL REISSUE APPLICATIONS*

*Notice: A reissue application has been filed previously for the reissue of U.S. Pat. No. 6,473,379. The previously filed reissue application is application Ser. No. 10/973,099.*

*DOMESTIC PRIORITY INFORMATION*

*This is a direct divisional of application Ser. No. 10/973,099, filed Oct. 26, 2004 now U.S. Pat. No. Re. 41,090; the entire contents of which are hereby incorporated by reference.*

BACKGROUND OF THE INVENTION

1. Field of the Invention

[The present invention relates to an optical disk and method for recording program or stream specific information (PSI or SSI) for recorded data stream in an optical disk such as a high-density digital versatile disk (HD-DVD) and providing the recorded PSI or SSI to a presenting device such as a digital television.] *The present invention relates to methods for recording and reproducing presentation control information from a recording medium such as an optical disc (e.g., an HD-DVD), and also to apparatuses for recording and reproducing as well as the recording medium.*

2. Description of the Related Art

A digital television which can receive digital broadcast programs and present them as high-quality picture and sound is being popularized. The digital broadcast signal to be processed in the digital television contains PSI for various programs and data presentation control as well as a digital video and audio signal. It is specified that the PSI should be intermittently inserted in the data stream of the digital broadcast signal.

Therefore, the digital television interprets the PSI received intermittently, and selects a program contained in the data stream and decodes data belonging to the selected program based on the PSI interpretation.

In the meantime, a disk device which is being developed to reproduce a high-density digital versatile disk (HD-DVD) whose recording standard is under discussion, is expected to be connected with a digital television as shown FIG. 1 through IEEE 1394 standard. The digital television 500 still requires PSI to select a program and to control data presentation when receiving and presenting the data stream from the disk device 100.

Therefore, when reproducing MPEG-formatted data stream recorded in a HD-DVD and sending it to the digital television 500 connected through a digital interface such as IEEE 1394 standard, the disk device 100 should provide PSI, which consists of a program association table (PAT), a program map table (PMT), a conditional access table (CAT), and so on as shown in FIG. 2, to the digital television 500 in the format of a transport stream (TS) consisting of 188-byte-long transport packets (TPs).

To provide PSI for a recorded data stream to the digital television, which is connected through a digital interface such as IEEE 1394 standard, intermittently and periodically as in a digital broadcast signal, it may be considered that PSI is recorded dispersedly and repeatedly in a data recording area 'AREA 1' of a HD-DVD as shown in FIG. 3, and it is retrieved and transmitted sequentially along with the data stream.

However, if PSI is recorded dispersedly and repeatedly in a data recording area of a disk, the recording area for real data, that is, video and/or audio data is greatly reduced, which causes a decrease in the recording efficiency of a disk.

In addition, the digital television must wait to receive one in a regular sequence among the PSI recorded dispersedly in the data recording area to present a received data stream even though data receiving has been resumed after a reproduction point is moved according to a key command of a user, or the digital interface such as IEEE 1394 standard is reset. Since the digital television can not select a data stream to decode into real picture and/or sound until the PSI for the data stream is received, there is inevitably discontinuity in video and/or audio or blank screen for a duration of time.

SUMMARY OF THE INVENTION

[It is an object of the present invention to provide an optical disk containing PSI in its management recording area and a method for recording PSI in an optical disk and providing the recorded PSI to a digital television, which records PSI for the recorded data stream in a specific area where management information for the recorded real data is written and, if it is time to send PSI, searches and reads PSI written in the specific area and sends it to a digital television.]

[A method of recording stream specific information along with a data stream in a disk according to the present invention, checks whether stream specific information needs to be changed while recording the data stream in the disk, generates stream specific information corresponding to the data stream being recorded based on the checked result, and writes the generated stream specific information and an additional information, the additional information consisting of start and/or end position data of a related stream object, to link the stream specific information with a stream object.]

[A method of providing data stream and stream specific information recorded in a disk according to the present invention, determines whether it is the time to send stream specific information, obtains stream specific information related with a stream object being reproduced or to be reproduced based on the determination result, and transmits the obtained stream specific information, wherein the stream objects have different contents of stream specific information differing from each other.] *In one embodiment, the present invention provides an optical disk containing PSI in its management recording area and a method for recording PSI in an optical disk and providing the recorded PSI to a digital television. The PSI for the recorded data stream may be recorded in a specific area where management information for the recorded real data is written. If it is time to send PSI, the PSI written in the specific area is searched, read and sent to a digital television.*

*In one embodiment, a method of recording stream specific information along with a data stream in a disk according to the present invention, determines whether stream specific information needs to be changed while recording the data stream in the disk, generates stream specific information cor-*

*responding to the data stream being recorded based on the determination, and writes the generated stream specific information and additional information. The additional information may consist of start and/or end position data of a related stream object, to link the stream specific information with a stream object.*

*In another embodiment, a method of providing data stream and stream specific information recorded in a disk according to the present invention, determines whether it is the time to send stream specific information, obtains stream specific information related with a stream object being reproduced or to be reproduced based on the determination result, and transmits the obtained stream specific information. Here, the stream objects may have stream specific information differing from each other.*

*In a further embodiment of the present invention, an apparatus for recording information on a recording medium includes a pick-up for writing information on the recording medium, and a controller controlling the information supplied to the pick-up. The information includes at least video information and presentation control information for managing presentation of the video information. The presentation control information includes change information for the video information, and the change information indicates a point in the video information where at least a portion of the presentation control information for the video information changes.*

*In one embodiment, the change information indicates a time in the video information where at least a portion of the presentation control information for the video information changes.*

*In another embodiment of the present invention, an apparatus for reproducing information on a recording medium includes a pick-up for reproducing information from the recording medium. The information includes at least video information and presentation control information for managing presentation of the video information. The presentation control information includes change information for the video information, and the change information indicates a point in the video information where at least a portion of the presentation control information for the video information changes. Here, the change information may indicate a time in the video information where at least a portion of the presentation control information for the video information changes.*

*In yet another embodiment of the present invention, a method of reproducing information on a recording medium includes reproducing information from the recording medium. The information includes at least video information and presentation control information for managing presentation of the video information. The presentation control information includes change information for the video information, and the change information indicates a point in the video information where at least a portion of the presentation control information for the video information changes. The change information may indicate a time in the video information where at least a portion of the presentation control information for the video information changes.*

*A further embodiment of the present invention, provides a method of supplying information for recording on a recording medium. The supplied information includes at least video information and presentation control information for managing presentation of the video information. The presentation control information includes change information for the video information, and the change information indicates a point in the video information where at least a portion of the presentation control information for the video information changes. Here, the change information may indicate a time in the video information where at least a portion of the presentation control information for the video information changes.*

*A still further embodiment of the present invention provides a recording medium having a data structure for managing at least video data recorded on the recording medium. The recording medium includes a recording area storing at least video information and presentation control information for managing presentation of the video information. The presentation control information includes change information for the video information, and the change information indicates a point in the video information where at least a portion of the presentation control information for the video information changes. The change information may indicate a time in the video information where at least a portion of the presentation control information for the video information changes.*

BRIEF DESCRIPTION OF THE DRAWINGS

[The accompanying drawings, which are included to provide a further understanding of the invention, illustrate the preferred embodiments of the invention, and together with the description, serve to explain the principles of the present invention.] *The accompanying drawings, which are included to provide a further understanding of the invention, illustrate the exemplary embodiments of the invention, and together with the description, serve to explain the principles of the present invention.*

In the drawings.

[DETAILED DESCRIPTION OF THE PREFERRED EMBODIMENTS] *DETAILED DESCRIPTION OF THE EMBODIMENTS*

[In order that the invention may be fully understood, preferred embodiments thereof will now be described with reference to the accompanying drawings.] *In order that the invention may be fully understood, exemplary embodiments thereof will now be described with reference to the accompanying drawings.*

Figure 4:
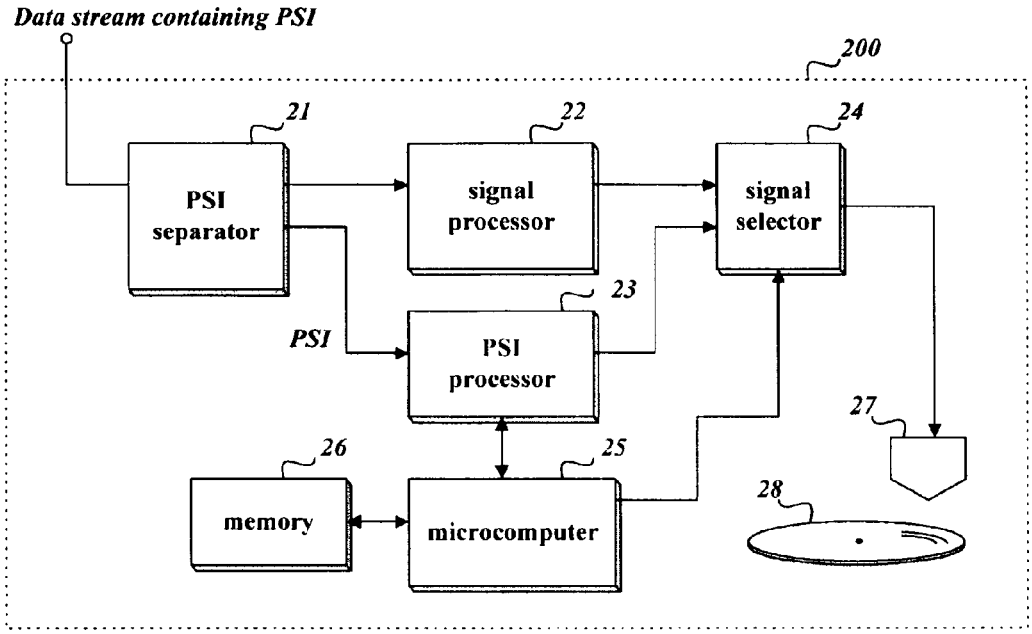
FIG. 4 is a block diagram of a disk device to which a data stream recording method according to the present invention is applied.

FIG. 4 is a partial block diagram of a disk device, which a PSI-recording method according to the present invention is applied to, for recording data in a high density disk.

The disk device of FIG. 4 comprises a PSI separator 21 separating PSI contained in the received broadcast signal; a signal processor 22 processing the received digital broadcast signal, which the PSI is separated from, into a digital stream compatible with a recording format; a PSI processor 23 processing the separated PSI into a digital stream compatible with a recording format; a signal selector 24 selecting one of either the broadcast digital stream and the PSI stream; a pickup 27 writing the stream selected by the signal selector 24 in a high-density disk 28; a microcomputer 25 controlling the overall recording operation; and a memory 26 for storing data necessary for control operation of the microcomputer 25.

The recording operation of the disk device 200 configured as above is described in detail.

Figure 1:
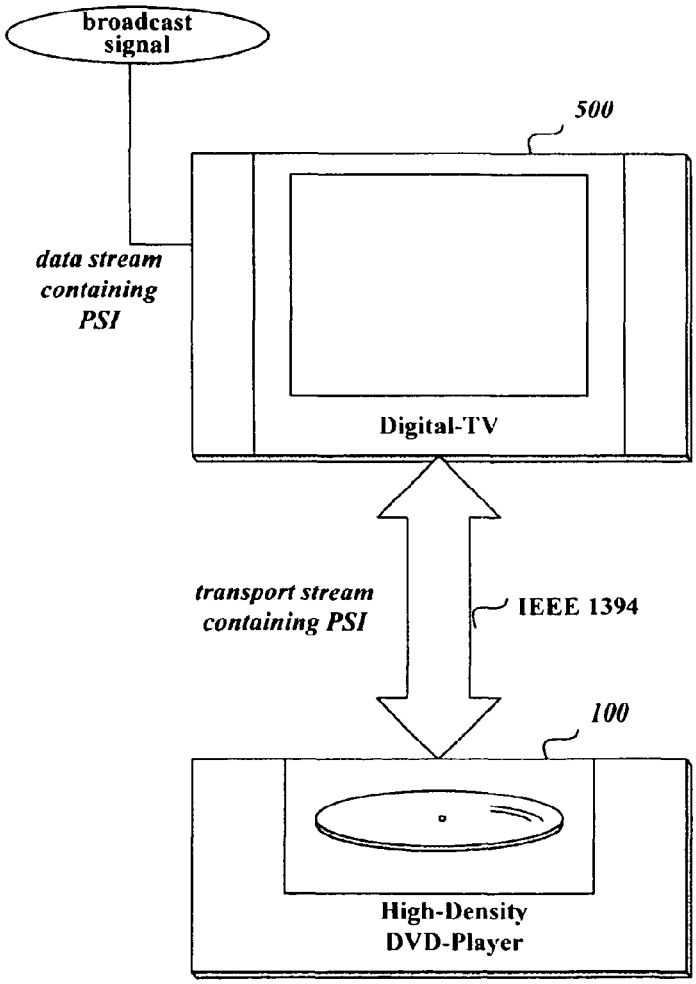
FIG. 1 shows a digital television and a high-density disk reproducing device which are connected each other.
Figure 2:
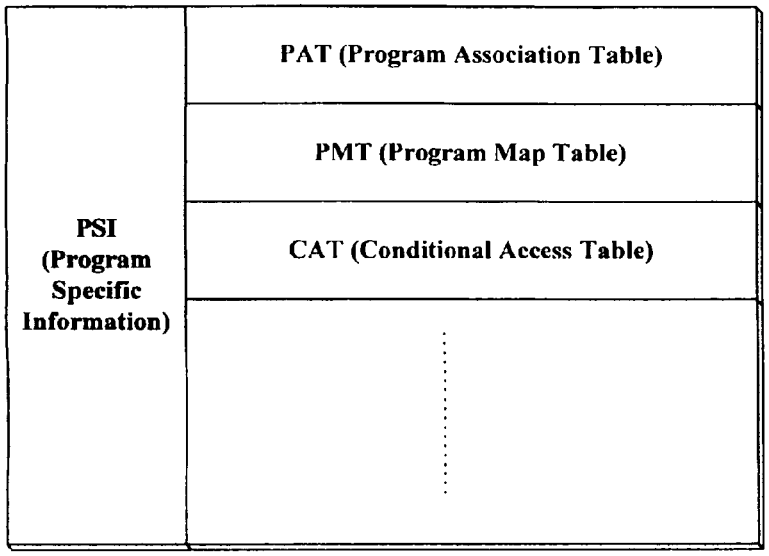
FIG. 2 shows partial contents of program specific information.
Figure 3:
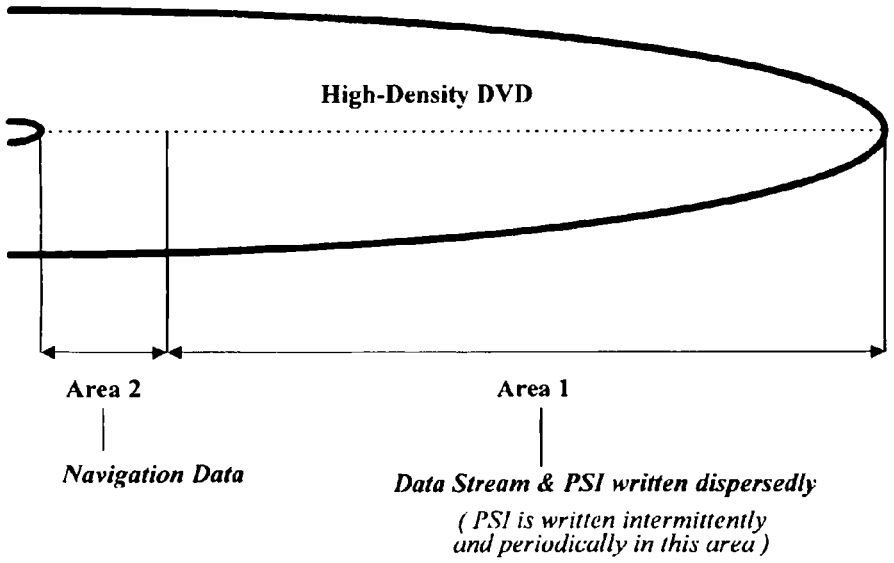
Conventional Art FIG. 3
FIG. 3 shows partitioned recording areas and contents to be recorded thereon.

The PSI separator 21 detects PSI, which consists of PAT, PMT, CAT, and so on as explained above referring to FIG. 2, contained intermittently in digital broadcast signal, and separates it from the received digital broadcast signal. The PSI processor 23 processes the separated PSI into a digital stream compatible with the recording format of a high-density rewritable digital versatile disk (HD-DVD RAM), and the microcomputer 25 compares the separated PSI with PSI detected previously to determine whether the separated PSI is new, that is, the separated PSI contains data which is different from the data of the previous PSI. If the separated PSI is new, it is written in the high-density disk 28 under control of the microcomputer 25 after being processed by the PSI processor 23.

When the PSI is processed by the PSI processor 23, control information may be appended to the PSI or the PSI is modified for various presentation appropriate for a data stream reproduced from a disk device. The modified PSI or control information appended PSI is called stream specific information (SSI).

The recording area where the PSI is written is a management information recording area where navigation data is written. The navigation data is used for controlling reproduction and presentation of recorded broadcast data containing a video and/or audio data stream processed by the signal processor 22. When writing PSI (or SSI), the micro-computer 25 generates linking information between the written PSI (or SSI) and a stream object, and appends the generated linking information to the written PSI (or SSI). A stream object corresponds to a single program or a digital stream recorded from recording start to stop, and the linking information consists of start and end time of each stream object.

All of the PSI (or SSI) including the linking information for stream objects, each stream object having different specific information for its own data stream, is written in the management information recording area.

Figure 5:
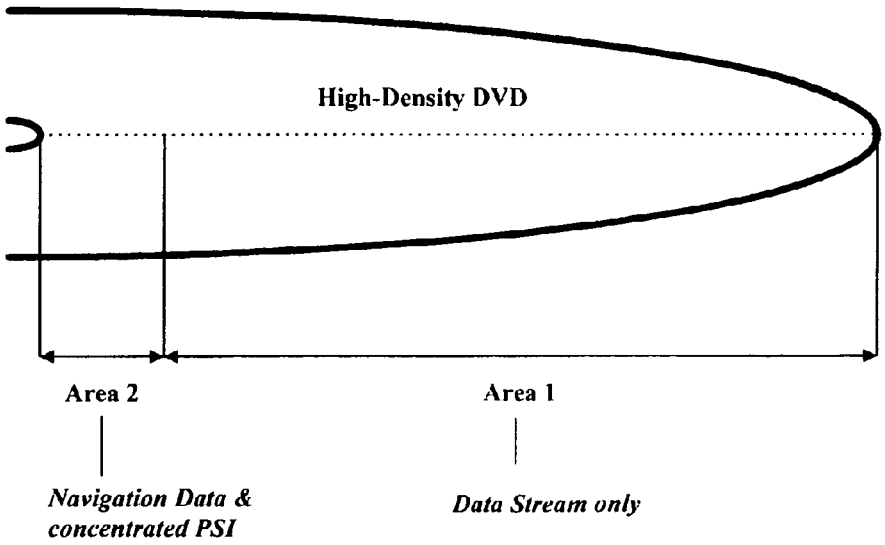
FIG. 5 shows partitioned recording areas and contents to be recorded thereon according to the present invention.

In the meantime, the high-density disk 28 has two partitioned recording areas 'AREA 1' and 'AREA 2' as shown in FIG. 5, the one 'AREA 1' being for real data such as video and/or audio data which is grouped by stream object, the other 'AREA 2' being for management information such as navigation data which is used for controlling reproduction and presentation of recorded stream objects. As explained above, the detected PSI, which will be transmitted to a digital television connected through a digital interface such as IEEE 1394 to select a data stream from the disk device and to decode the selected stream, is also written in the management information recording area 'AREA 2'.

Since PSI (or SSI) is written in the management information recording area 'AREA 2', the storage capacity of the data recording area 'AREA 1' is not reduced.

From now on, a method of reproducing a data stream and specific information from the disk having PSI (or SSI) written only in the management information recording area 'AREA 2' and providing them to a digital television will be described.

Figure 6:
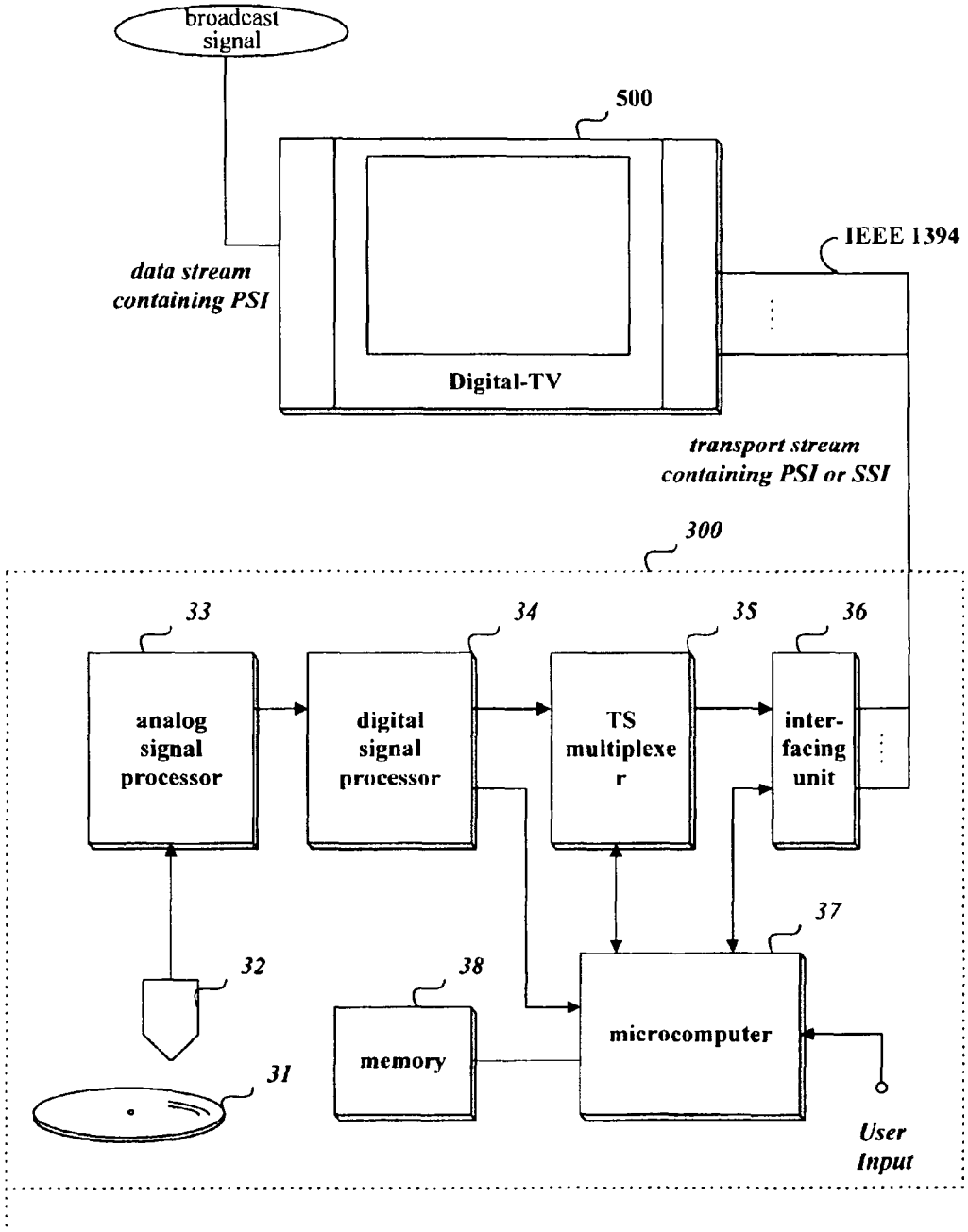
FIG. 6 is a block diagram of a disk device to which a data stream reproducing method according to the present invention is applied.

FIG. 6 is a block diagram of a disk device to conduct the method of reproducing and providing data stream and specific information according to the present invention.

The disk device 300 shown in FIG. 6 comprises an optical pickup 32 detecting recorded signals of a high-density disk 31 having PSI (or SSI) written in the area 'AREA 2'; an analog signal processor 33 processing the electrical signal from the pickup 32 to convert it into a binary signal; a digital signal processor 34 processing the binary signal to obtain real data and PSI (or SSI); a TS multiplexer 35 multiplexing the real data and PSI (or SSI) and converting the multiplexed data into TS; an interfacing unit 36 transmitting the TS to a digital television 500 connected through IEEE 1394 standard; a microcomputer 37 supervising the overall reproduction operation; and a memory 36 for storing data necessary for control operation of the microcomputer 37.

The microcomputer 37 conducts an operation to provide PSI (or SSI), which corresponds to the present data stream being reproduced or to be reproduced, to the digital television 500. To do so, it reads from the management information recording area 'AREA 2' when a key command directly from a user is entered, a packet command from the digital television 500 connected through IEEE 1394 standard is received, or there occurs a bus reset on the IEEE 1394. Then, the digital television 500 interprets the PSI (or SSI) received through the IEEE 1394 bus, and selects and decodes a data stream based on the interpretation of the PSI (or SSI).

Figure 7:
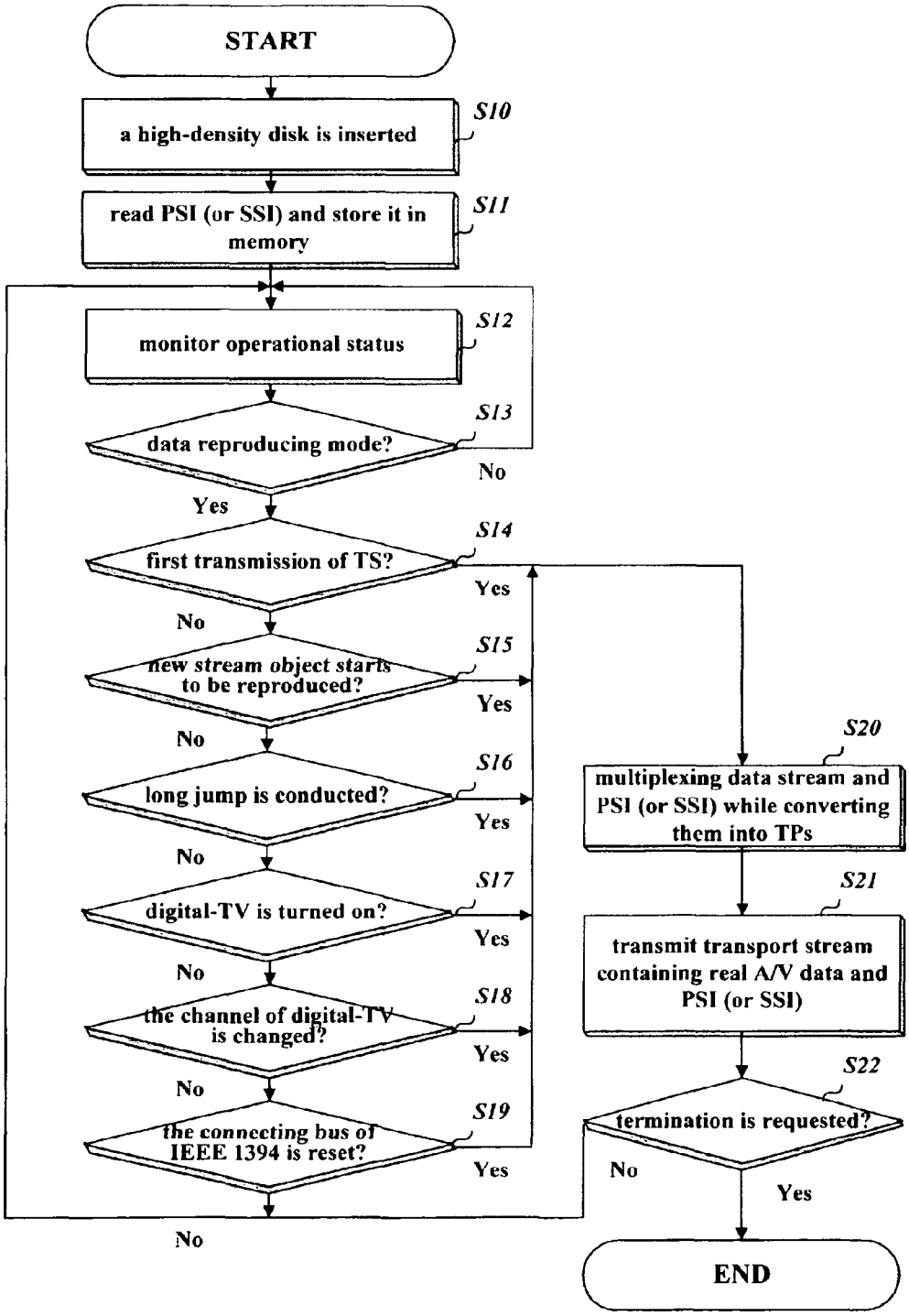
FIG. 7 shows a flow diagram of method for providing stream specific information according to the present invention.

FIG. 7 is a flow diagram of sending PSI (or SSI) to a digital television according to the present invention. The PSI (or SSI) sending procedure to be conducted by the disk device 300 is described in detail referring to FIG. 7.

If the disk 31 having PSI (or SSI) written in the management information recording area is inserted onto a tray (not figured) of the disk device 300 (S10), the microcomputer 37 moves the pickup 32 to the management information recording area 'AREA 2' to read navigation data and PSI (or SSI), and stores them in the memory 38 (S11).

After that, the microcomputer 37 monitors (S12) the operation mode of the disk device 300 and the digital television 500 connected through IEEE 1394 standard as well as whether a bus reset occurs on the digital interface of IEEE 1394. If the operation mode of the disk device 300 is reproduction mode (S13) in which a data stream recorded in the disk is or to be reproduced and transmitted in the form of TS, the microcomputer 37 checks whether a transmission operation of TS is first (S14), and if so, it searches the memory 38 for PSI (or SSI) corresponding to a stream object to be reproduced based on the linking information appended to all of PSI (or SSI) and applies the adequate PSI (or SSI) to the TS multiplexer 35 along with the real data stream reproduced from the data recording area 'AREA 1' of the disk 31.

The TS multiplexer 35 multiplexes the PSI (or SSI) and real data stream while converting them into TS consisting of stream information packets (SIPs) and data packets, and transmits the converted TS to the connected digital television 500 through the interfacing unit 36.

The SIP may be transmitted more than once to prevent [from] accident loss in *the* communication channel before sending real data packets, and it may contain time reference information such as program clock reference (PCR) to be used to synchronize an internal clock beforehand for timing control of data presentation in the digital television 500.

Figure 8:
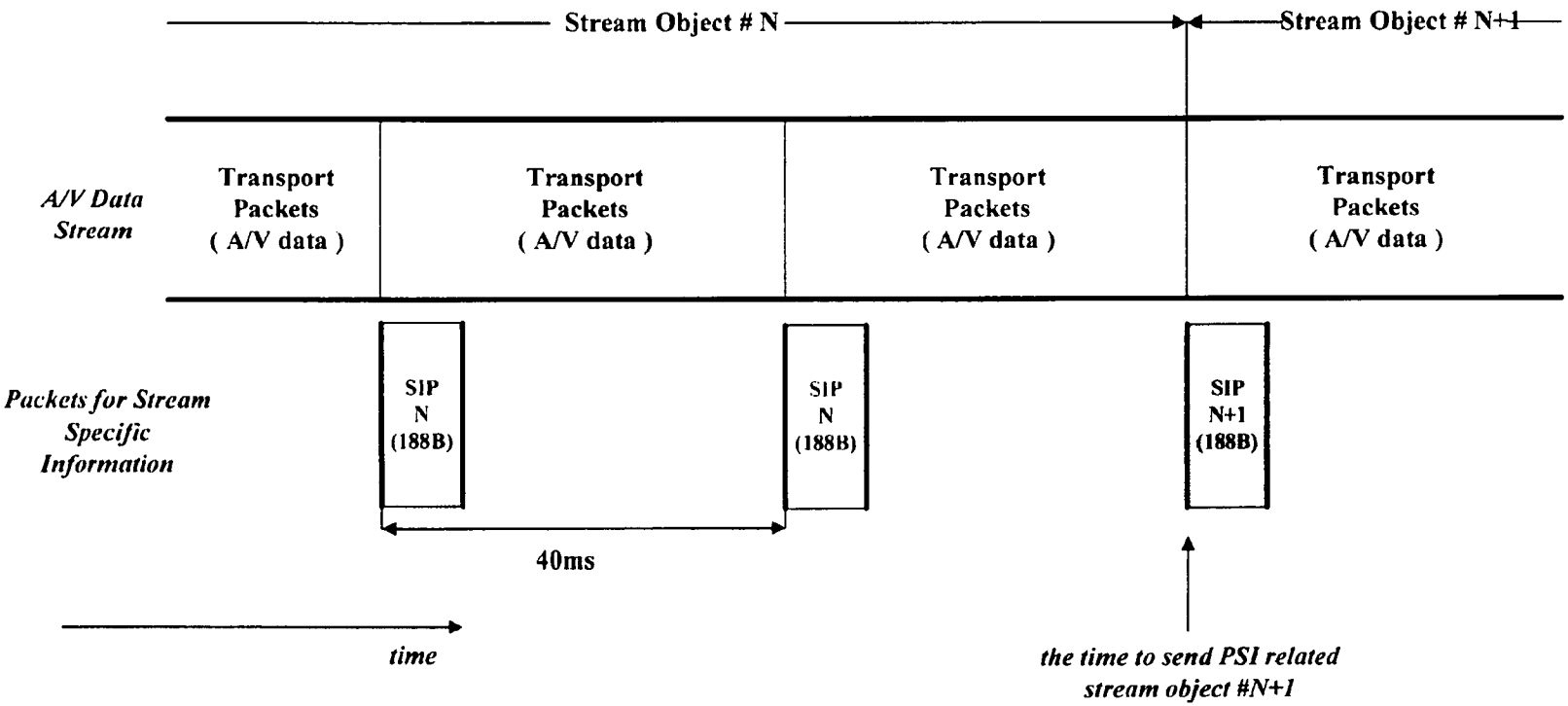
FIG. 8 shows an example of when to transmit stream specific information.

The SIP may be 188-bytes long as specified for a transport packet (TP) in digital broadcast standard, and it may be transmitted repeatedly every 40 msec as shown in FIG. 8.

If a data stream of a new program starts to be transmitted, that is, a new stream object starts to be reproduced (S15) while a data stream being reproduced from the high-density disk 31 is being transmitted in the format of TS, the microcomputer 37 also searches the memory 38 for PSI (or SSI)

corresponding to the new stream object to be reproduced and applies the appropriate PSI (or SSI) to the TS multiplexer 35 along with the real data stream belonging to the new stream object which is reproduced from the data recording area 'AREA 1' of the disk 31.

For example, if the start position information of the (N+1)-th stream object is detected after the N-th stream object is completely reproduced as shown in FIG. 8 while reproducing the disk 31, the microcomputer 37 reads the PSI (or SSI) corresponding to the (N+1)-th stream object from the memory 38 and then applies the read PSI (or SSI) to the TS multiplexer 35. In other words, the microcomputer 37 searches for PSI (or SSI) corresponding to each stream object being provided to the digital television 500 at present, based on the linking information and applies the found PSI (or SSI) to the TS multiplexer 35.

Therefore, the TS multiplexer 35 multiplexes the PSI (or SSI) and real data stream of the present stream object (S20) while converting them into TS consisting of stream information packets and data packets, and transmits the converted TS to the connected digital television 500 through the interfacing unit 36 (S21).

And, if the microcomputer 37 conducts a long jump of the pickup 32 according to a key input from a user (S16), it searches the memory 38 for PSI (or SSI) corresponding to the new or same stream object to be reproduced after the long jump, and applies the appropriate PSI (or SSI) to the TS multiplexer 35 along with the real data stream belonging to the stream object to which the pickup 32 is moved.

Then, the TS multiplexer 35 multiplexes the PSI (or SSI) and real data stream while converting them into TS consisting of stream information packets and data packets (S20), and transmits the converted TS to the connected digital television 500 through the interfacing unit 36 (S21).

And, if the digital television 500 connected with the disk device 300 through the IEEE 1394 standard is turned on (S17) or its viewing channel is changed (S18), a corresponding command is sent to the microprocessor 37 of the disk device 300 through the digital interface. At this time, the microcomputer 37 reads PSI (or SSI) corresponding to a stream object being provided, or to be provided on request of disk reproduction to the digital television 500, and applies the appropriate PSI (or SSI) to the TS multiplexer 35 along with the real data stream, if it is in a reproducing mode at present.

Then, as explained above, the TS multiplexer 35 multiplexes the PSI (or SSI) and real data stream, if it is applied, while converting them into TS consisting of stream information packets and data packets (S20), and transmits the converted TS to the connected digital television 500 through the interfacing unit 36 (S21).

Furthermore, if a reset occurs on the IEEE 1394 digital interface (S19), the microcomputer 37 detects the reset while monitoring the status of the digital interfacing bus, reads again PSI (or SSI) corresponding to a stream object being provided, or to be provided to the digital television 500, and applies the appropriate PSI (or SSI) to the TS multiplexer 35 along with the real data stream, if it is in a reproducing mode at present.

Then, the TS multiplexer 35 multiplexes the PSI (or SSI) and real data stream, if it is applied, while converting them into TS consisting of stream information packets and data packets (S20), and transmits the converted TS to the connected digital television 500 through the interfacing unit 36 (S21).

The above-explained operations (S12 to S22) is conducted by the microcomputer 37 until the disk device 300 is turned off or is requested to stop.

To be brief, whenever there is a command from a user or the digital television 500 connected through IEEE 1394, or a reset occurs on the interface bus, the disk device 300 reads the stored PSI (or SSI), which was reproduced beforehand from the management information recording area 'AREA 2' of the high-density disk 31, and then provides the read PSI (or SSI) to the connected digital television 500, so that the digital television 500 can select and decode the data stream from the disk device 300 immediately after the interpretation of the PSI (or SSI) is done.

The method of providing specific information on a data stream according to the present invention can maintain the disk storage capacity for real video and/or audio data by recording stream specific information in a management recording area of a high-density disk, and provide the stream specific information to a digital television promptly when it is necessary, thereby reducing the time duration of blank screen or discontinuity in video and/or audio presentation.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

[1. A method of recording stream specific information along with data stream in a disk, comprising the steps of:

separating program specific information contained in a received broadcast signal from the broadcast signal;

converting the separated program specific information into stream specific information and processing the stream specific information into a digital stream compatible with a recording format;

comparing the separated stream specific information with previous stream specific information to determine whether if contains data that is different from the previous stream specific information;

checking whether stream specific information is the same or needs to be changed while recording the data stream in the disk;

generating stream specific information corresponding to the data stream being recorded based on a result obtained from said checking; and writing the generated stream specific information and additional information linking the stream specific information with a stream object.]

[2. The method set forth in claim 1, wherein the additional information consists of start and/or end position data of a corresponding stream object.]

[3. The method set forth in claim 1, wherein the stream specific information is written in the same packetized format that the data stream is written in.]

[4. The method set forth in claim 1, wherein the data stream is grouped into a single stream object if it is determined that the stream specific information needs to be changed.]

[5. The method set forth in claim 1, wherein the stream specific information is written in a management information recording area where presentation control information of the data stream is to be written.]

[6. A method of providing data stream and stream specific information recorded in a disk, comprising the steps of:

(a) determining whether it is time to send stream specific information;

(b) obtaining stream specific information corresponding to a stream object being reproduced or to be reproduced based on the result obtained from determining in (a); and (c) transmitting the obtained stream specific information.]

[7. The method set forth in claim 6, wherein a stream object contains stream specific information, wherein the stream specific information for one object differs from the stream specific information of another object.]

[8. The method set forth in claim 6, wherein said step (b) searches for stream specific information corresponding to a stream object based on additional information appended to each stream specific information, the additional information having data to link stream specific information with a stream object.]

[9. The method set forth in claim 8, wherein the additional information has start and/or end position data of a corresponding stream object.]

[10. The method set forth in claim 6, wherein the stream specific information has been written in a management information recording area where presentation control information of a data stream has been written.]

[11. The method set forth in claim 6, wherein said step (a) determines that it is time to send the stream specific information when a current reproduction position on the disk is moved.]

[12. The method set forth in claim 6, wherein said step (a) determines that it is time to send the stream specific information when a connected device receiving a reproduced data stream is turned on.]

[13. The method set forth in claim 6, wherein said step (a) determines that it is time to send the stream specific information when a data stream belonging to a new stream object starts to be reproduced.]

[14. The method set forth in claim 6, wherein said step (a) determines that it is time to send the stream specific information when a digital bus connected to a device receiving the reproduced data stream is reset.]

[15. The method set forth in claim 6, wherein said step (a) determines that it is time to send the stream specific information when the viewing channel of the connected device receiving the reproduced data stream is changed.]

[16. The method set forth in claim 6, wherein said step (c) transmits the obtained stream specific information more than once before sending a reproduced real video and/or audio data stream.]

[17. The method set forth in claim 6, wherein data packets delivering the stream specific information contain time reference information to be used for data presentation timing in a connected device receiving a reproduced data stream.]

[18. A disk device comprising divided recording areas, one being a data area where a digital stream of video and/or audio data is written, the other being a management information area where stream specific information for controlling the reproduction and presentation of the data written in said data area are written, wherein the stream specific information is associated with each stream object which is a grouping unit of the written digital stream.]

[19. The disk device as set forth in claim 18, wherein the stream specific information is associated with each stream object by linking information appended to each stream specific information, the linking information being indicative of a start and/or end position of an associated stream object.]

*20. A tangible recording medium storing a data structure for managing presentation of at least video data recorded on the recording medium, comprising:*

*video information including at least the video data; and*

*management information including presentation control information for managing presentation of the video information,*

*wherein the presentation control information includes change information for the video information, the change information indicating a point in the video information where at least a portion of the presentation control information for the video information changes.*

*21. The tangible recording medium of claim 20, wherein the change information indicates a time in the video information where at least a portion of the presentation control information for the video information changes.*

*22. The tangible recording medium of claim 20, wherein the video information is packetized.*

*23. The tangible recording medium of claim 22, wherein the presentation control information is packetized.*

*24. The tangible recording medium of claim 20, wherein the tangible recording medium is an optical disc.*

*25. A method of recording information for managing presentation of video information on a recording medium, comprising:*

*checking at least a portion of presentation control information for one or more changes in the presentation control information, the presentation control information being for managing presentation of the video information;*

*generating change information indicating a point in the video information where at least a portion of the presentation control information for the video information changes; and*

*recording at least the video information and the presentation control information corresponding to the video information on the recording medium, the presentation control information including the change information.*

*26. The method of claim 25, wherein the change information indicates a time in the video information where at least a portion of the presentation control information for the video information changes.*

*27. The method of claim 25, wherein the video information is packetized.*

*28. The method of claim 27, wherein the presentation control information is packetized.*

*29. The method of claim 25, wherein the recording medium is an optical disc.*

*30. A apparatus for recording information for managing presentation of video information on a recording medium, comprising:*

*a recording unit configured to record information on the recording medium; and*

*a controller, operably coupled to the recoding unit, configured to control the recording unit to*

*check at least a portion of presentation control information for one or more changes in the presentation control information, the presentation control information being for managing presentation of the video information,*

*generate change information indicating a point in the video information where at least a portion of the presentation control information for the video information changes, and*

*record at least the video information and the presentation control information corresponding to the video information on the recording medium, the presentation control information including the change information.*

*31. The apparatus of claim 30, wherein the change information indicates a time in the video information where at least a portion of the presentation control information for the video information changes.*

*32. The apparatus of claim 30, wherein the video information is packetized.*

*33. The apparatus of claim 32, wherein the presentation control information is packetized.*

*34. The apparatus of claim 30, wherein the recording medium is an optical disc and the recording unit includes an optical pick-up.*

*35. A method of reproducing information on a recording medium, comprising:*

*reproducing video information from the recording medium;*

*reproducing presentation control information from the recording medium, the presentation control information being for managing presentation of the video information, the presentation control information including change information for the video information, the change information indicating a point in the video information where at least a portion of the presentation control information for the video information changes.*

*36. The method of claim 35, wherein the change information indicates a time in the video information where at least a portion of the presentation control information for the video information changes.*

*37. The method of claim 35, wherein the video information is packetized.*

*38. The method of claim 37, wherein the presentation control information is packetized.*

*39. The method of claim 35, wherein the recording medium is an optical disc.*

*40. An apparatus for reproducing information on a recording medium, comprising:*

*a reproducing unit configured to reproduce information recorded on the recoding medium;*

*a controller, operably coupled to the reproducing unit, configured to control the reproducing unit to reproduce at least video information and presentation control information for managing presentation of the video information, the presentation control information including change information for the video information, the change information indicating a point in the video information where at least a portion of the presentation control information for the video information changes.*

*41. The apparatus of claim 40, wherein the change information indicates a time in the video information where at least a portion of the presentation control information for the video information changes.*

*42. The apparatus of claim 40, wherein the video information is packetized.*

*43. The apparatus of claim 42, wherein the presentation control information is packetized.*

*44. The apparatus of claim 40, wherein the recording medium is an optical disc and the reproducing unit includes an optical pick-up.*

* * * * *